(12) United States Patent
Averett (10) Patent No.: US 7,429,203 B1
(45) Date of Patent: Sep. 30, 2008

(54) AMPHIBIOUS DRIVE SYSTEM FOR A BOAT

(76) Inventor: Edwin M. Averett, 5367 Appledore La., Tallahassee, FL (US) 32309

( * ) Notice: Subject to any disclaimer, the term of this patent is extended or adjusted under 35 U.S.C. 154(b) by 0 days.

(21) Appl. No.: 11/724,742

(22) Filed: Mar. 16, 2007

(51) Int. Cl.
*B63H 1/04* (2006.01)
(52) U.S. Cl. .......................................... 440/91; 440/57
(58) Field of Classification Search .............. 440/12.5, 440/90, 91, 92, 51, 53, 57, 61 R, 61 S, 61 T
See application file for complete search history.

(56) References Cited

U.S. PATENT DOCUMENTS

| | | | |
|---|---|---|---|
| 2,711,708 A * | 6/1955 | Thornburg | 440/91 |
| 2,863,159 A | 12/1958 | Beay | |
| 3,740,075 A | 6/1973 | Soehnlen | |
| 4,008,679 A | 2/1977 | Bozzano | |
| 4,241,686 A | 12/1980 | Westphalen | |
| 4,658,751 A | 4/1987 | Koot | |
| 4,832,642 A * | 5/1989 | Thompson | 440/90 |
| 4,872,413 A * | 10/1989 | Hebert | 440/92 |
| 4,958,584 A | 9/1990 | Williamson | |
| 5,632,221 A | 5/1997 | Trenne et al. | |
| 5,769,021 A | 6/1998 | Schad | |
| 5,931,710 A * | 8/1999 | Johnson, Sr. | 440/57 |
| 6,264,518 B1 * | 7/2001 | Price | 440/91 |
| 6,364,723 B1 | 4/2002 | Hite | |
| 6,390,866 B1 * | 5/2002 | Nystrom | 440/57 |
| 6,814,636 B2 * | 11/2004 | Nolen | 440/90 |
| 6,902,449 B1 * | 6/2005 | Faucheux et al. | 440/57 |
| 6,945,832 B2 | 9/2005 | Roycroft | |

* cited by examiner

*Primary Examiner*—Lars A Olson
(74) *Attorney, Agent, or Firm*—J. Wiley Horton (57) ABSTRACT

An improved amphibious drive system for a watercraft. The amphibious drive system features a paddled drive wheel which is operatively mounted to a drive frame. The drive frame pivots about a horizontal pivot joint. The drive wheel can thereby be raised and lowered with respect to the watercraft. In the elevated position the drive wheel is only partially submerged in the water (such that the drive wheel may operate like a paddlewheel). In the lowered position the drive is submerged more deeply in the water. The amphibious drive system also features a mount plate for attaching the amphibious drive system to the transom of the watercraft. A swing-arm frame links the drive frame to the mount plate. The swing-arm frame pivots in the horizontal direction relative to the watercraft via a vertically-oriented kingpin. This action angularly offsets the thrust from the drive wheel, thereby allowing steering.

16 Claims, 7 Drawing Sheets

AMPHIBIOUS DRIVE SYSTEM FOR A BOAT

BACKGROUND OF THE INVENTION

1. Field of the Invention

This invention relates to the field of boats and watercraft. More specifically, the present invention comprises an amphibious drive system for a boat or other watercraft.

2. Description of the Related Art

Various designs for amphibious vehicles are known in the prior art. These designs typically employ one drive system for propelling the vehicle through the water. A second and separate drive system is typically used to drive the amphibious vehicle across land. The use of multiple drive systems to achieve combined water and land travel capabilities is a significant disadvantage of the prior art. Most significantly, the use of two separate drive systems increases cost and weight.

Thus, it would be advantageous to provide a single amphibious drive system that is capable of driving a vehicle over land and through water.

BRIEF SUMMARY OF THE PRESENT INVENTION

The present invention comprises an improved amphibious drive system for a watercraft. The amphibious drive system features a paddled drive wheel which is operatively mounted to a drive frame. The drive frame pivots about a horizontal pivot joint. The drive wheel can thereby be raised and lowered with respect to the watercraft. In the elevated position the drive wheel is only partially submerged in the water (such that the drive wheel may operate like a paddlewheel). In the lowered position the drive is submerged more deeply in the water. The amphibious drive system also features a mount plate for attaching the amphibious drive system to the transom of the watercraft. A swing-arm frame links the drive frame to the mount plate. The swing-arm frame pivots in the horizontal direction relative to the watercraft via a vertically-oriented kingpin. This action angularly offsets the thrust from the drive wheel, thereby allowing steering.

REFERENCE NUMERALS IN THE DRAWINGS

| 10 | amphibious drive system | 12 | boat |
|---|---|---|---|
| 14 | transom mount plate | 16 | swing-arm frame |
| 18 | kingpin | 20 | pivot joint |
| 22 | drive frame | 24 | drive wheel housing |

-continued

REFERENCE NUMERALS IN THE DRAWINGS

| 26 | drive wheel | 28 | motor housing |
|---|---|---|---|
| 30 | hydraulic cylinder | 32 | hydraulic cylinder |
| 34 | embankment | 36 | upright |
| 38 | end plate | 40 | drum |
| 42 | flange | 44 | paddle members |

DETAILED DESCRIPTION OF THE INVENTION

Figure 1:
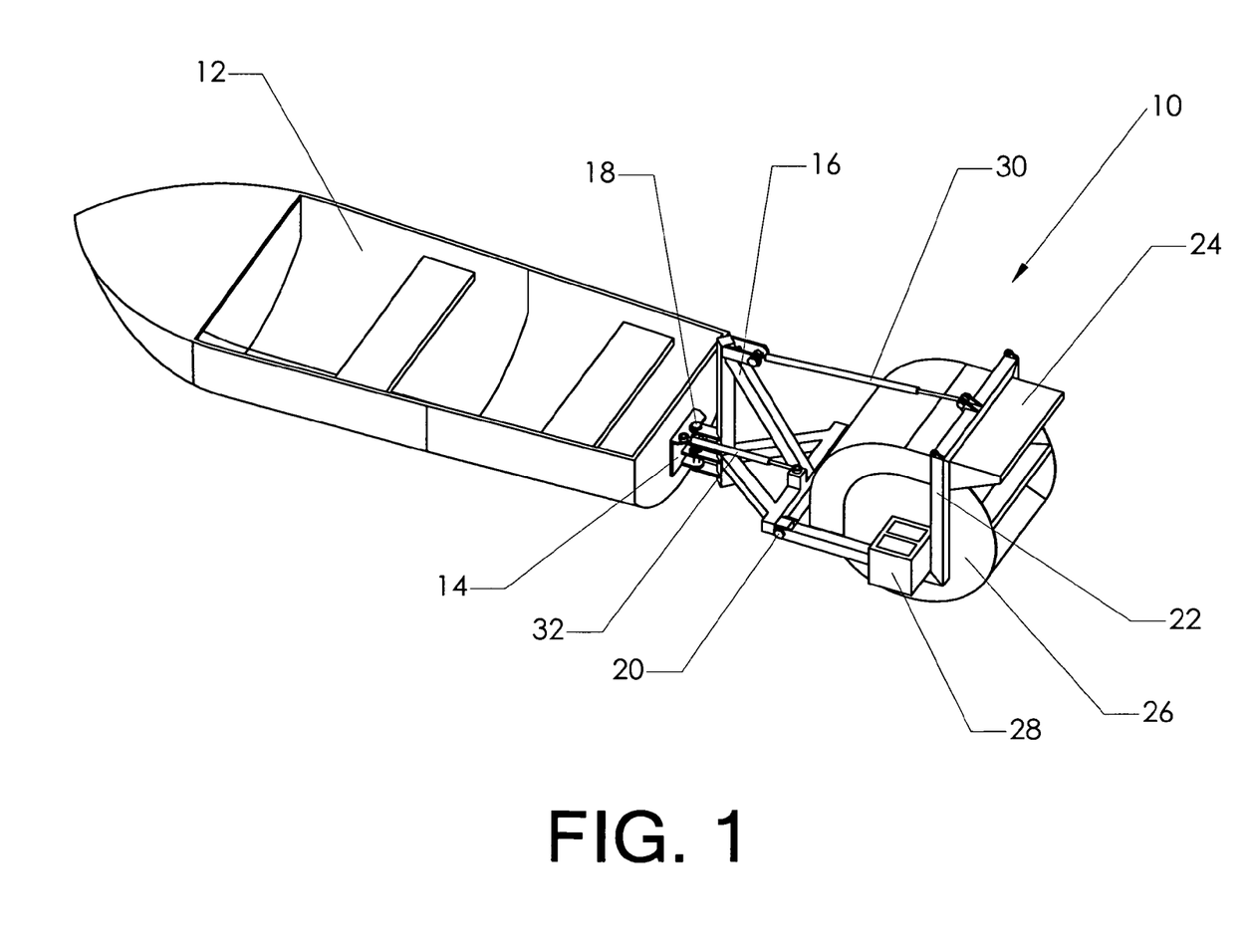
FIG. 1 is a perspective view, showing an amphibious drive system attached to a watercraft.

The present invention, amphibious drive system 10, is illustrated in FIG. 1. Amphibious drive system 10 mounts to the transom of boat 12 by transom mount plate 14. Bolts or other fasteners may be used to secure transom mount plate 14 to boat 12. Swing-arm frame 16 is linked to transom mount plate 14 by kingpin 18 which forms a vertically-oriented pivot joint. Hydraulic cylinder 32 attaches to and extends between transom mount plate 14 and swing-arm frame 16. The extension and retraction of hydraulic cylinder 32 causes swing-arm frame 16 to pivot in a horizontal plane relative to boat 12 about kingpin 18 as will be explained in greater detail subsequently.

Drive frame 22 is linked to swing-arm frame 16 by a pair of pivot joints 20. The far pivot joint is a mirror of the near pivot joint visible in FIG. 1. Hydraulic cylinder 30 attaches to and extends between drive frame 22 and swing-arm frame 16. The extension and retraction of hydraulic cylinder 30 causes drive frame 22 to pivot in a vertical plane relative to boat 12 about pivot joints 20 as will be explained in greater detail subsequently. Drive wheel 26 is operatively attached to drive frame 22 by a center axle (not visible in FIG. 1) passing through the center of drive wheel 26. Drive wheel 26 rotates about is center axis when powered by a motor which is contained within motor housing 28. Drive wheel housing 24 is also attached to drive frame 22 and wraps around the top and forward facing portions of drive wheel 22 to prevent water from being kicked back on the occupants of boat 12.

Figure 2:
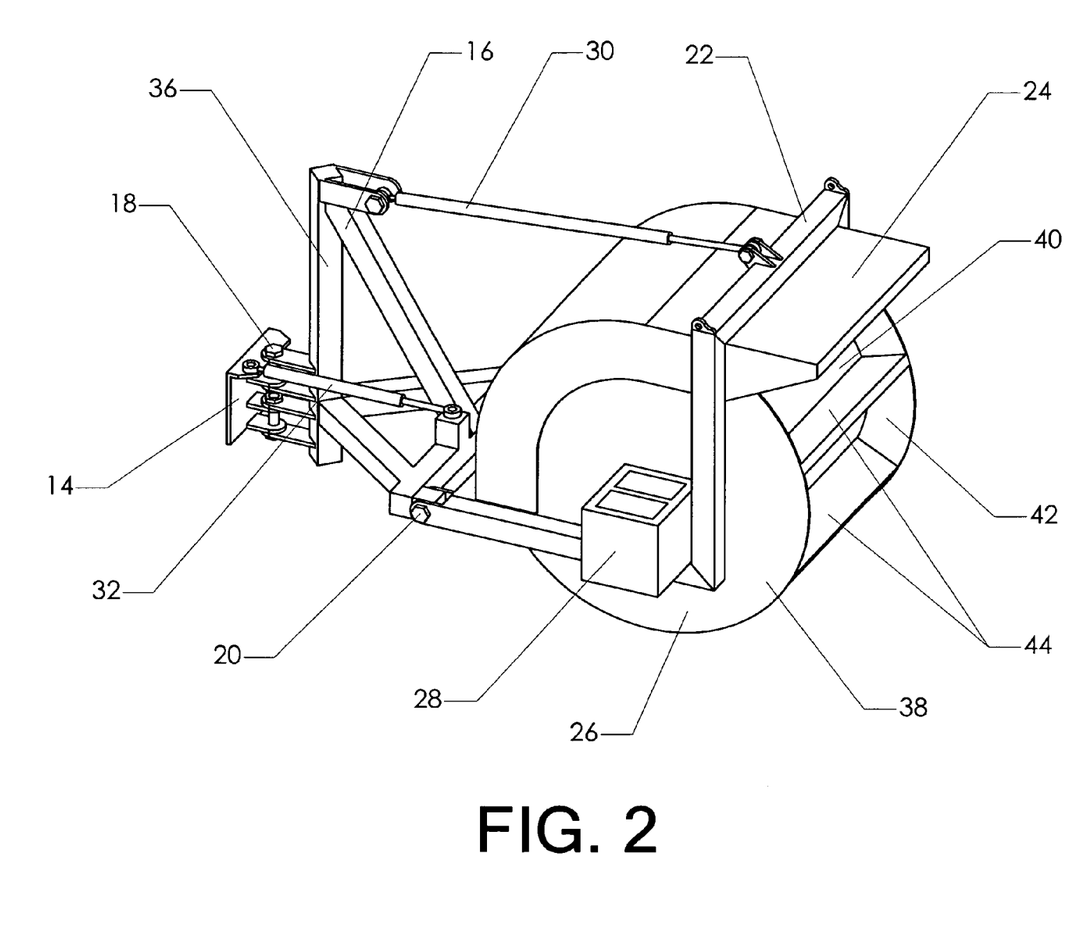
FIG. 2 is a perspective view, showing details of the amphibious drive system.

A detailed view of the present invention is provided in FIG. 2. Hydraulic cylinder 30 attaches to the top of upright 36 of swing-arm frame 16 and to the top cross-member of drive frame 22. This allows hydraulic cylinder 30 to extend far enough to submerge the drive wheel into the water without contacting paddle housing 24.

As shown in FIG. 2, drive wheel 26 is generally constructed of drum 40 which is sandwiched between two end plates 38. Because the diameter of drum 40 is smaller than the diameter of end plates 38, flange 42 is formed on both sides of drive wheel 26. Paddle members 44 extend between end plates 38 and attach to flanges 42 and drum 40. There are many other ways different drive wheel designs that may be used in accordance with the present invention, however.

Figure 3:
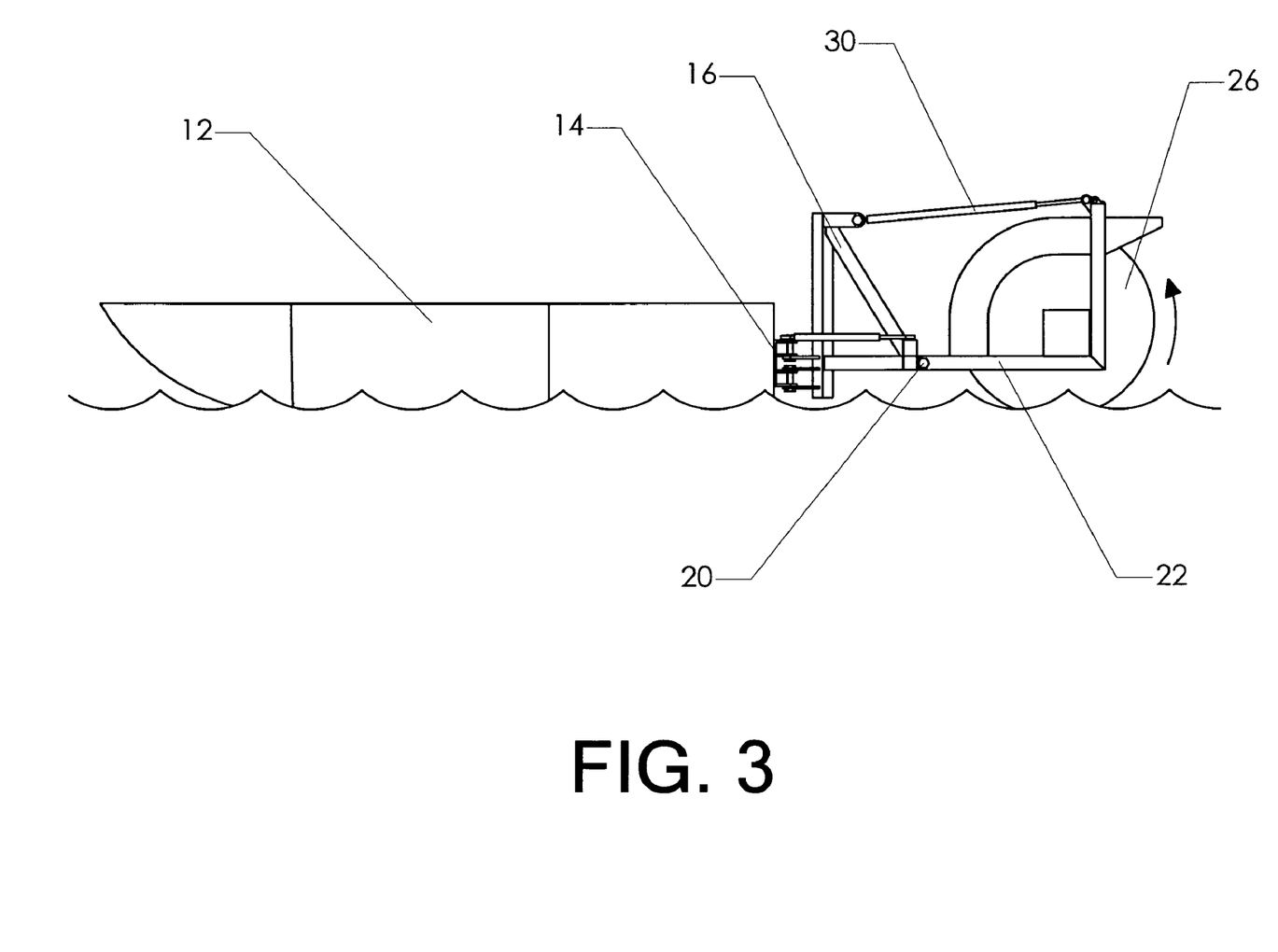
FIG. 3 is a side view, showing the drive wheel in the elevated position.

FIG. 3 illustrates operation of the amphibious drive system when drive wheel 26 is positioned in the elevated position. This is the preferred orientation of drive wheel 26 when traversing relatively deep water. When in the elevated position, hydraulic cylinder 30 is maintained in a non-extended state. An arrow is provided in FIG. 3 to indicate the direction of rotation of drive wheel 26 during forward travel. Drive wheel 26 rotates in the opposite direction when traveling in reverse. The reader will note that when the drive wheel spins, the boat is propelled through the water.

Figure 4:
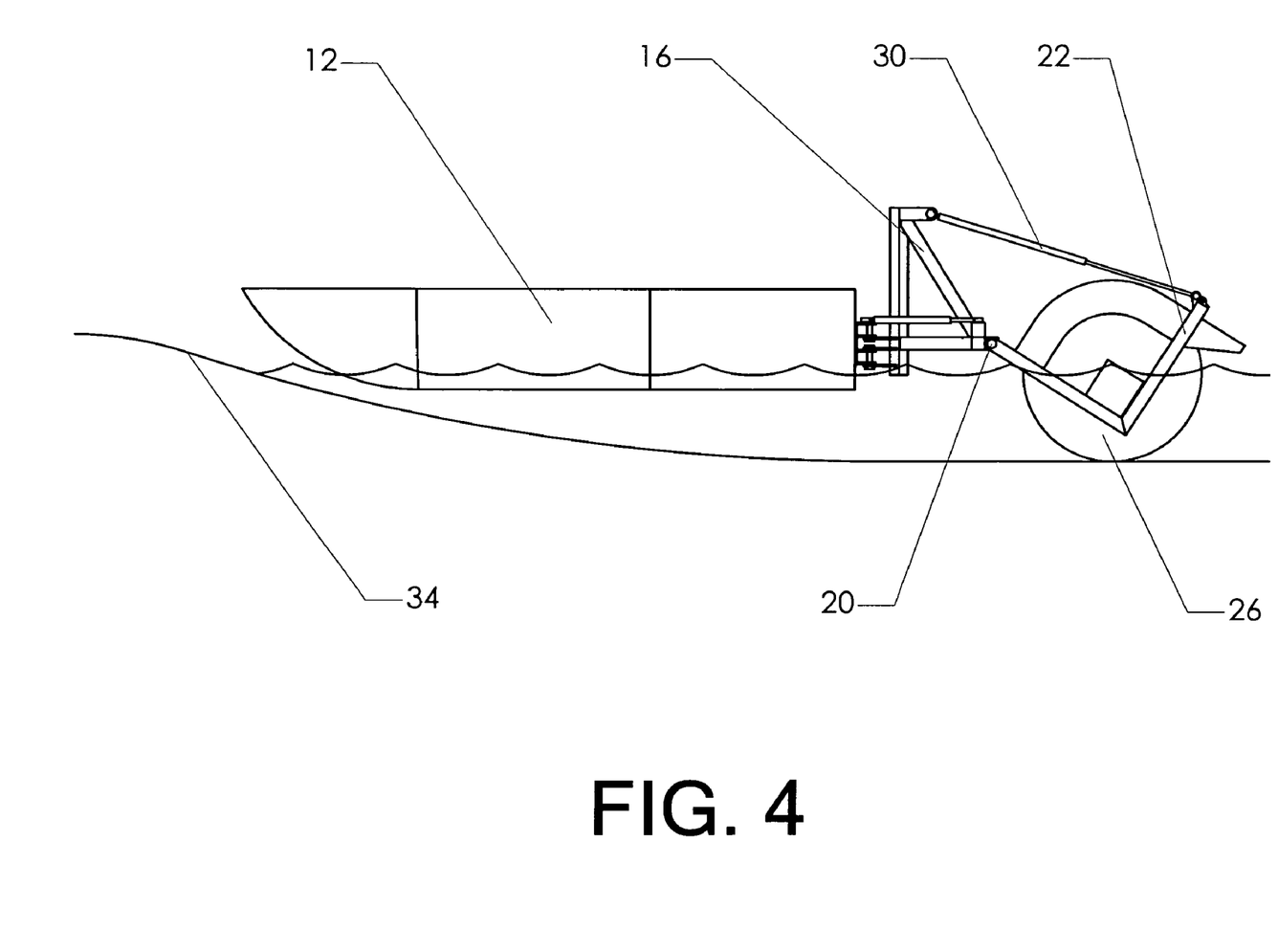
FIG. 4 is a side view, showing the drive wheel in the lowered position.

FIG. 4 illustrates how drive wheel 26 may be lowered when approaching embankment 34. This feature of the present invention allows the operator of boat 12 to "drive" boat 12 onto the shore. When driving onto the shore, drive wheel 26 contacts embankment 34 and rolls across the ground propelling boat 12 onto the shore. To lower drive wheel 26 to the lowered position, hydraulic cylinder 30 is extended. When hydraulic cylinder 30 is extended, drive frame 22 pivots about pivot joints 20 in a vertical plane. Hydraulic cylinder 30 can be actuated or controlled by a switch provided on the boat's control panel.

Figure 5:
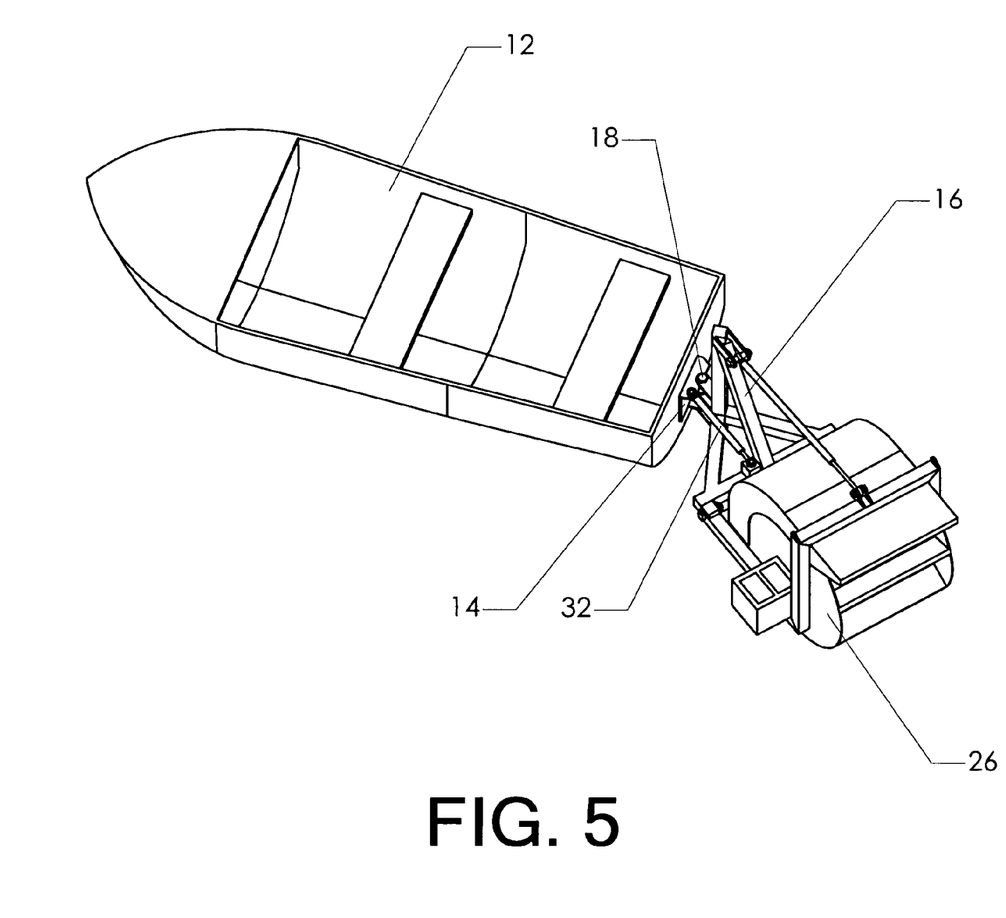
FIG. 5 is a perspective view, illustrating horizontal pivot of the swing-arm frame about the kingpin.
Figure 6:
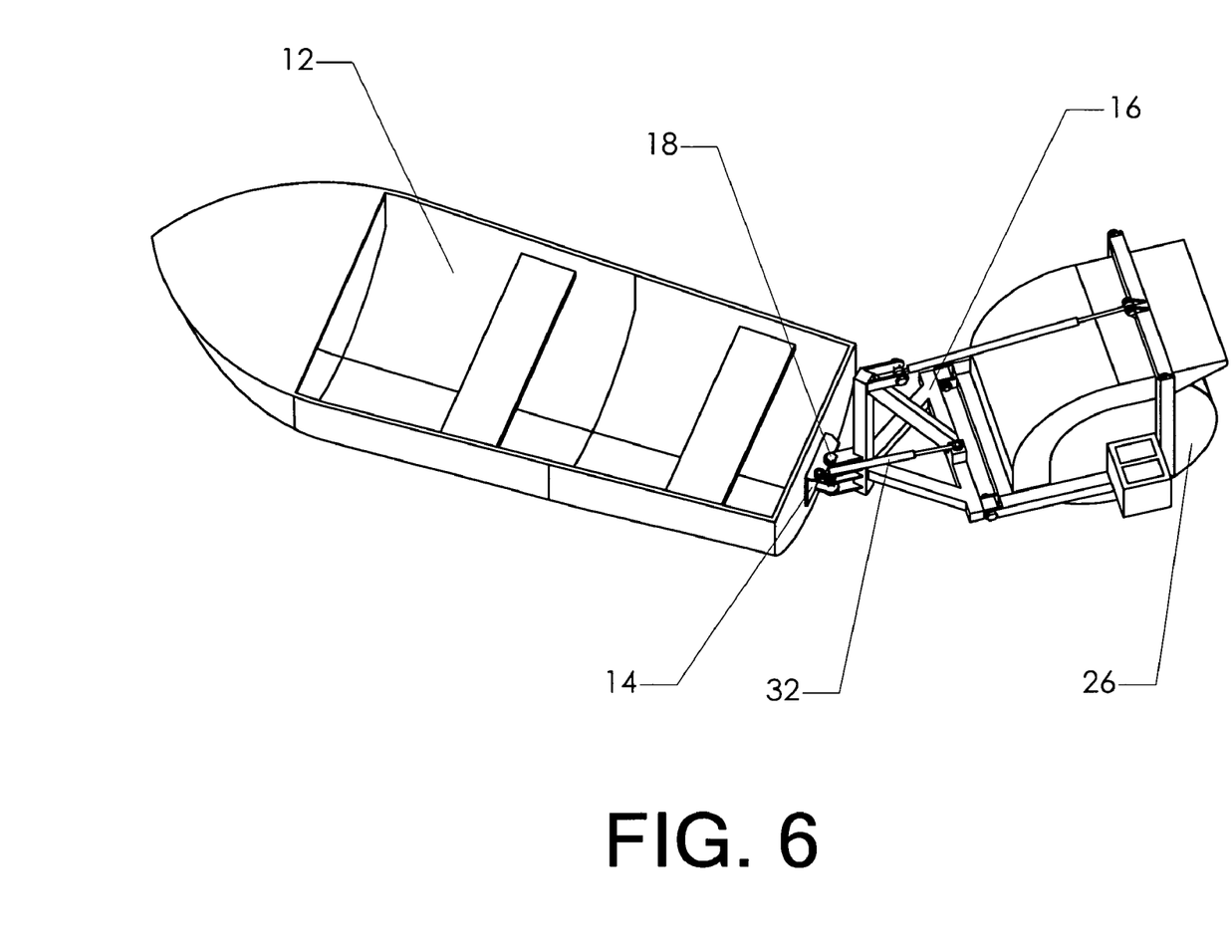
FIG. 6 is a perspective view, illustrating horizontal pivot of the swing-arm frame about the kingpin.

FIGS. 5 and 6 illustrate how the proposed amphibious drive system can be used to turn the boat left and right, respectively. Hydraulic cylinder 32 causes swing-arm frame 16 to pivot in the horizontal direction about kingpin 18. As shown in FIG. 5, hydraulic cylinder 32 is retracted to execute a left turn. As shown in FIG. 6, hydraulic cylinder 32 is extended to execute a right turn. As with hydraulic cylinder 30, hydraulic cylinder 32 may be controlled by a switch or steering wheel type input. In the preferred embodiment, swing-arm frame rotates up to 70 degrees about kingpin 18 in each direction relative to its normal, centered position.

Figure 7:
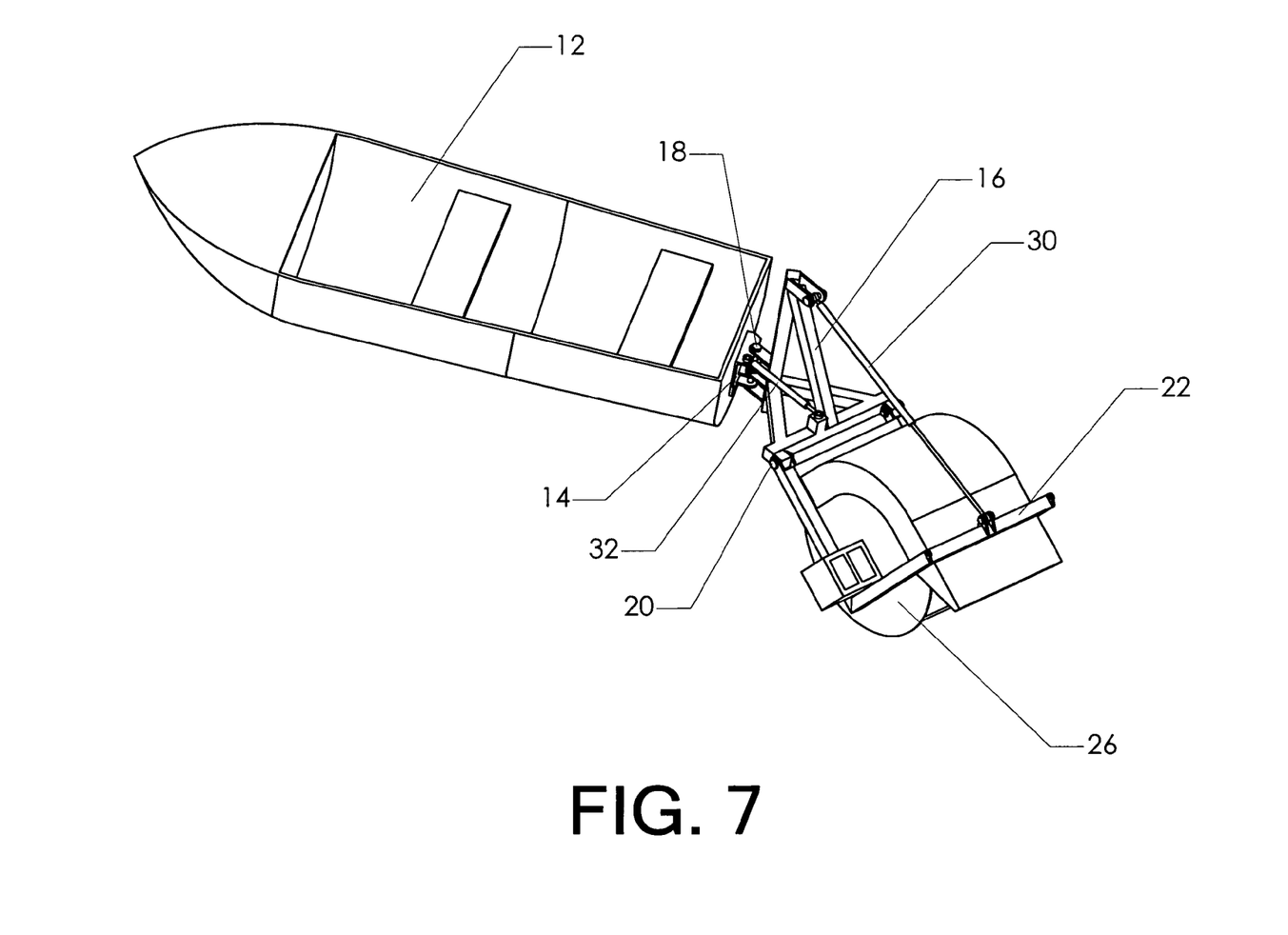
FIG. 7 is a perspective view, illustrating combined vertical and horizontal pivot of the amphibious drive system.

FIG. 7 illustrates how both hydraulic cylinders may be actuated to move drive wheel 26 in the horizontal direction and vertical direction simultaneously. This feature is particularly useful for dislodging boat 12 if boat 12 runs across a sand bar or other seemingly, non-traversable obstruction in the water. The drive wheel can actually be used to lift the rear of the watercraft and swing the boat sideways. In some cases, it may be necessary for the operator to rotate drive wheel 26 back and forth between various positions to dislodge boat 12.

By now, the reader should appreciate that the proposed amphibious drive system is useful in many different amphibious applications. For example, the ability of the proposed amphibious drive system to "walk" boat 12 onto an embankment makes the proposed drive system a good choice for watercraft that are operated in regions remote to docks. Also, the ability of the proposed amphibious drive system to dislodge boat 12 from entanglements makes the proposed drive system a good choice for watercraft used in shallow waterways or wetlands.

A hydraulic pump and reservoir are preferably contained in the watercraft to operate the hydraulic cylinders. A hydraulic drive motor may also be used to turn the paddlewheel. Hydraulic lines and hydraulic controls would also be present. Generally, the hydraulic pump supplies positive hydraulic pressure to the hydraulic cylinders to cause the hydraulic cylinders to extend. The hydraulic pump also could supply positive hydraulic pressure to the drive motor to turn the drive wheel. Those that are skilled in the art will know how to integrate these components of hydraulic control with the described amphibious drive system.

Although the preceding descriptions contain significant detail they should not be viewed as limiting the invention but rather as providing examples of the preferred embodiments of the invention. For example, many different types of motors or engines may be used to rotate the drive wheel. Also, linear actuators may be used in place of the hydraulic cylinders. Accordingly, the scope

I claim:

1. An amphibious drive system for a watercraft operated by an operator comprising:
    a. a drive wheel configured to rotate about a center axis and propel said watercraft through the water;
    b. a first pivot joint pivotally connecting said drive wheel to said watercraft, wherein said first pivot joint is substantially horizontal with respect to said watercraft; and
    c. a second pivot joint pivotally connecting said drive wheel to said watercraft, wherein said second pivot joint is substantially vertical with respect to said watercraft;
    d. a motor configured to rotate said drive wheel about said center axis;
    e. a first linear actuator configured to cause said drive wheel to pivot vertically about said first pivot joint;
    f. a second linear actuator configured to cause said drive wheel to pivot horizontally about said second pivot joint;
    g. a controller configured to actuate said first linear actuator and said second linear actuator separately or in combination when said motor rotates said drive wheel such that said operator can use said controller to adjust the angle of said center axis of said drive wheel relative to said watercraft and thereby steer said watercraft as said motor is rotating said drive wheel.

2. The amphibious drive system of claim 1, further comprising a drive frame attached to said drive wheel, said drive frame configured to pivot in the vertical direction relative to said watercraft between an elevated position in which said drive wheel is only partially submerged in said water and a lowered position in which said drive wheel is submerged to a greater extent than when said drive frame is positioned in said elevated position.

3. The amphibious drive system of claim 1, further comprising:
    a. a mount plate, said mount plate configured to attach said amphibious drive system to the transom of said watercraft; and
    b. a swing-arm frame attached to said mount plate and said drive frame, said swing arm frame configured to pivot in the horizontal direction relative to said watercraft.

4. The amphibious drive system of claim 2, further comprising:
    a. a mount plate, said mount plate configured to attach said amphibious drive system to the transom of said watercraft; and
    b. a swing-arm frame attached to said mount plate and said drive frame, said swing arm frame configured to pivot in the horizontal direction relative to said watercraft.

5. The amphibious drive system of claim 3, further comprising a vertically-oriented kingpin linking said swing arm to said mount plate.

6. The amphibious drive system of claim 5, wherein said second linear actuator attaches to said swing-arm frame, said second linear actuator configured to cause said swing-arm frame to pivot about said kingpin when said second linear actuator is extended or retracted.

7. The amphibious drive system of claim 3, wherein said first linear actuator attaches to said swing-arm frame and said drive frame, said first linear actuator configured to cause said drive frame to pivot about said first pivot joint when said first linear actuator is extended or retracted.

8. The amphibious drive system of claim 1, wherein said motor is a hydraulic drive motor.

9. An amphibious drive system for a watercraft comprising:
    a. a drive wheel configured to rotate about a center axis and propel said watercraft through the water;
    b. a moveable connection between said drive wheel and said watercraft;
    c. wherein said moveable connection is configured to allow said drive wheel to pivot in a substantially vertical plane with respect to said watercraft; and
    d. wherein said moveable connection is configured to allow said drive wheel to pivot in a substantially horizontal plane with respect to said watercraft;
    a motor configured to rotate said drive wheel about said center axis;

f. a first linear actuator configured to cause said drive wheel to pivot vertically;

g. a second linear actuator configured to cause said drive wheel to pivot horizontally;

h. a controller configured to actuate said first linear actuator and said second linear actuator separately or in combination when said motor rotates said drive wheel such that said operator can use said controller to adjust the angle of said center axis of said drive wheel relative to said watercraft and thereby steer said watercraft as said motor is rotating said drive wheel.

10. The amphibious drive system of claim 9, further comprising:

a. a mount plate, said mount plate configured to attach said amphibious drive system to the transom of said watercraft; and b. a swing-arm frame attached to said mount plate and a drive frame, said swing arm frame configured to pivot in the horizontal direction relative to said watercraft.

11. The amphibious drive system of claim 10, wherein said drive frame attached to said drive wheel, said drive frame configured to pivot in the vertical direction relative to said watercraft between an elevated position in which said drive wheel is only partially submerged in said water and a lowered position in which said drive wheel is submerged to a greater extent than when said drive frame is positioned in said elevated position.

12. The amphibious drive system of claim 10, further comprising a vertically-oriented kingpin linking said swing arm to said mount plate.

13. The amphibious drive system of claim 10, wherein said second linear actuator attaches to said swing-arm frame, said second linear actuator configured to cause said swing-arm frame to pivot in the horizontal direction when said second linear actuator is extended or retracted.

14. The amphibious drive system of claim 13, wherein said first linear actuator attaches to said swing-arm frame and said drive frame, said first linear actuator configured to cause said drive frame to pivot vertically when said first linear actuator is extended or retracted.

15. The amphibious drive system of claim 9, further comprising a drive frame attached to said drive wheel, said drive frame configured to pivot in the vertical direction relative to said watercraft between an elevated position in which said drive wheel is only partially submerged in said water and a lowered position in which said drive wheel is submerged to a greater extent than when said drive frame is positioned in said elevated position.

16. The amphibious drive system of claim 9, wherein said motor is a hydraulic drive motor.

* * * * *